US006318239B1

(12) United States Patent
Tsukada

(10) Patent No.: US 6,318,239 B1
(45) Date of Patent: Nov. 20, 2001

(54) NAILER AND BUMPER PROVIDED THEREIN FOR BRAKING IMPACT PISTON

(75) Inventor: Takao Tsukada, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 09/519,844

(22) Filed: Mar. 6, 2000

(30) Foreign Application Priority Data

Mar. 4, 1999 (JP) ........................................ 11-057632

(51) Int. Cl.[7] ........................ F01B 11/02; B23B 45/16; B25C 1/04

(52) U.S. Cl. ........................ 92/85 R; 173/210; 227/130

(58) Field of Search ........................ 92/85 R; 173/210; 227/130

(56) References Cited

U.S. PATENT DOCUMENTS 3,403,600 * 10/1968 Bade ........................ 227/130 X
3,504,840 * 4/1970 Wandel et al. ........................ 227/130
3,605,559 * 9/1971 Korth ........................ 227/130 X
3,776,445 * 12/1973 Pomeroy ........................ 227/130
3,871,566 * 3/1975 Elliesen et al. ........................ 227/130
4,188,858 * 2/1980 Plunkett ........................ 92/85 R X
4,549,344 * 10/1985 Nikolich ........................ 173/210 X
4,824,003 * 4/1989 Almeras et al. ........................ 173/210 X
5,056,701 * 10/1991 Bereiter ........................ 173/210 X
5,441,192 * 8/1995 Sugita et al. ........................ 227/130
5,485,946 * 1/1996 Jankel ........................ 227/130 X
5,878,936 * 3/1999 Adachi et al. ........................ 227/130

* cited by examiner

*Primary Examiner*—John E. Ryznic
(74) *Attorney, Agent, or Firm*—Oblon, Spivak, McClelland, Maier & Neustadt, P.C.

(57) ABSTRACT

A bumper for braking an impact piston is disposed at a lower part of an impact clinder for sidably housing the impact piston. The impact piston has a driver for driving a fastener and having a cylindrical shape at its upper portion. The bumper includes an upper part having a transverse section of an annulus ring the inner surface of which has a size to form a void been the inner surface and an outer surface of the upper portion of the driver, and a top surface for receiving the impact piston. The top surface has all outer diameter of the same size as that of the impact piston.

4 Claims, 5 Drawing Sheets

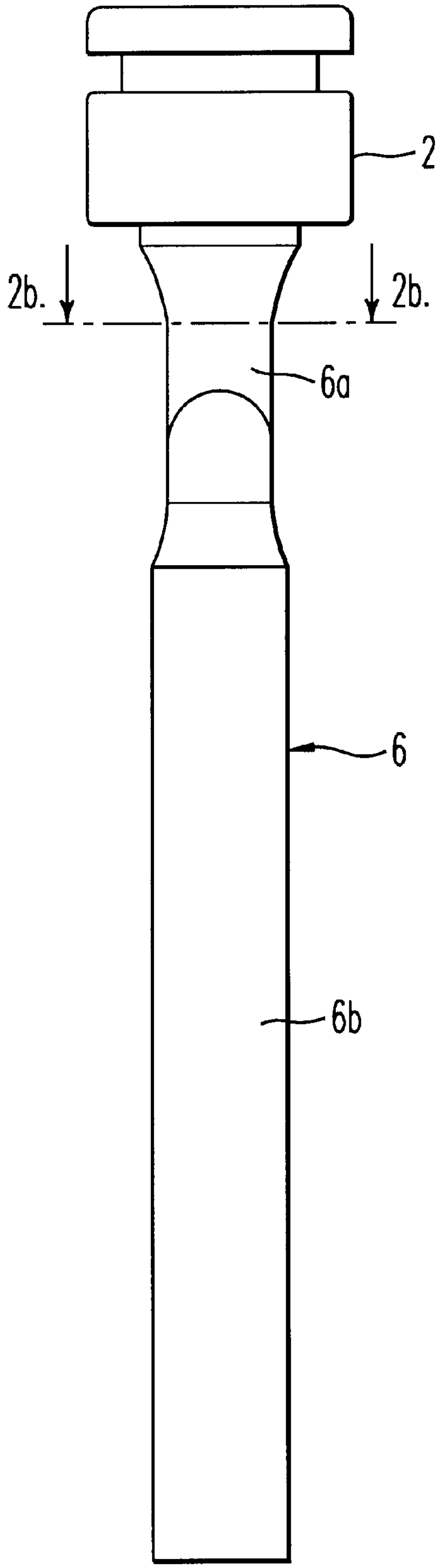
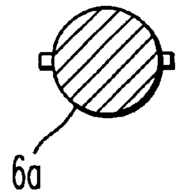
FIG. 2(b)
FIG. 2(a)

NAILER AND BUMPER PROVIDED THEREIN FOR BRAKING IMPACT PISTON

BACKGROUND OF THE INVENTION

1. Field of the Invention

The present invention relates to a nailer and a bumper provided therein for braking a motion of an impact piston.

2. Description of the Related Arts

Generally, a bumper provided within a nailer is disposed at a lower portion of an impact cylinder, which slidably houses an impact piston. Said bumper is used for braking the impact piston by receiving a bottom surface of the actuated impact piston when the nailer is driving in a fastener such as a nail. The term "nailer" means of an apparatus that includes so called a "tacker" for driving a staple in as well as an apparatus for driving in a various types of nails. In order to absorb an impact efficiently that is made by the impact piston, a volume of the bumper is desirably large. However, in case an outer diameter of the bumper is greater than that of a diameter of the impact piston, an upper surface of the bumper 10 is cracked due to the impact made when it is striked, as shown in FIG. 5(*a*), and the bumper is damaged. Particularly, in the case where a nailer with the impact piston of a small diameter is used, the bumper 10 may be also small. Therefore, a central hole of the bumper for inserting the driver of the nailer is deformed in accordance with the configuration of the driver, further, a reinforcement to thin parts of the deformed shape caused by the deformation is required. A transverse section of the driver 11 is formed in a rectangular shape so that a transverse section of a central hole 12 of the bumper 10 for inserting the driver 11, as shown in FIG. 5(*b*), is formed in an elliptic configuration to surround the driver 11.

However, in the case where the central hole 12 has the elliptic shape, a stress concentrates on the thin parts of the bumper 10 when the impact is made thereon by the impact piston. Therefore, it was difficult to design the bumper due to the of obtaining an equally distributed balance of load. Further, there was a problem that the performance of absorption and the durability of the bumper were not efficiently developed in reference to the increase in size.

Accordingly, with regard to a nailer by the use of high-pressurized compressed air whose output energy is large when it strikes a nail, and has a small diameter piston, it was difficult to obtain a sufficient size for the bumper. Therefore, it has been very difficult to design a bumper with good performance of absorption and durability.

SUMMARY OF THE INVENTION

It is an object of the present invention to provide a bumper and a nailer with said bumper disposed therein, which has a sufficient performance of absorption together with an efficient durability when an impact piston applies an impact on the bumper despite a small size of a diameter of said impact piston.

For attaining the aforementioned object, according to a first aspect of the present invention, there is provided a bumper including an upper part having a transverse section of an annulus ring, an inner surface of the annulus ring having a size to form a void between the inner surface and an outer surface of the upper portion of a driver, and a top surface for receiving an impact piston, the top surface having an outer diameter of the same size as that of the impact piston.

Consequently, there can be obtained a bumper small in size, having high durability and superior shock-absorbing performance.

According to a second aspect of the invention, there is provided a bumper including a transverse section of an annulus ring, an inner surface of the annulus ring having a size to form a void between the inner surface and an outer surface of the upper portion of a driver, and a longitudinal length longer than at least the amount of longitudinal shrinkage of the upper part of the bumper by an impact on collision of an impact piston against the upper part.

Consequently, there can be obtained a bumper having advantages similar to those of a bumper according to a first aspect.

According to a third aspect of the invention, there is provided a nailer equipped with a bumper including an upper part having a transverse section of an annulus ring, an inner surface of the annulus ring having a size to form a void between the inner surface and an outer surface of the upper portion of a driver, and a top surface for receiving an impact piston, the top surface having an outer diameter of the same size as that of the impact piston.

Consequently, there can be obtained a nailer provided with a bumper having advantages similar to those of a bumper according to a first aspect.

According to a fourth aspect of the invention, there is provided a nailer equipped with a bumper including an upper part formed in a shape having a transverse section of an annulus ring, an inner surface of the annulus ring having a size to form a void between the inner surface and an outer surface of the upper portion of a driver, and a longitudinal length longer than at least an amount of longitudinal shrinkage of an upper part of the bumper by an impact on collision of an impact piston against the upper part of the bumper.

Consequently, there can be obtained a nailer provided with a bumper having advantages similar to those of a bumper according to a first aspect.

BRIEF DESCRIPTION Of THE DRAWINGS

The above and other objects, features and advantages of the present invention will become more apparent from the following description taken in connection with the accompanying drawings, in which:

FIG. 2(*a*) is a side view of a driver joined together with an impact piston of the nailer in FIG. 1, and FIG. 2(*b*) is a sectional view of the driver viewed from the a—a line of FIG. 2(*a*).

FIG. 3(*b*) is a sectional view of the bumper viewed from the b—b line of FIG. 3(*a*).

FIG. 4(*a*) illustrates the state before the impact is made to the bumper, and FIG. 4(*b*) illustrates the state after the impact is made to the bumper.

DESCRIPTION OF THE PREFERRED EMBODIMENTS

An embodiment of a nailer according to the present invention will be described hereinafter with reference to the drawings.

Figure 1:
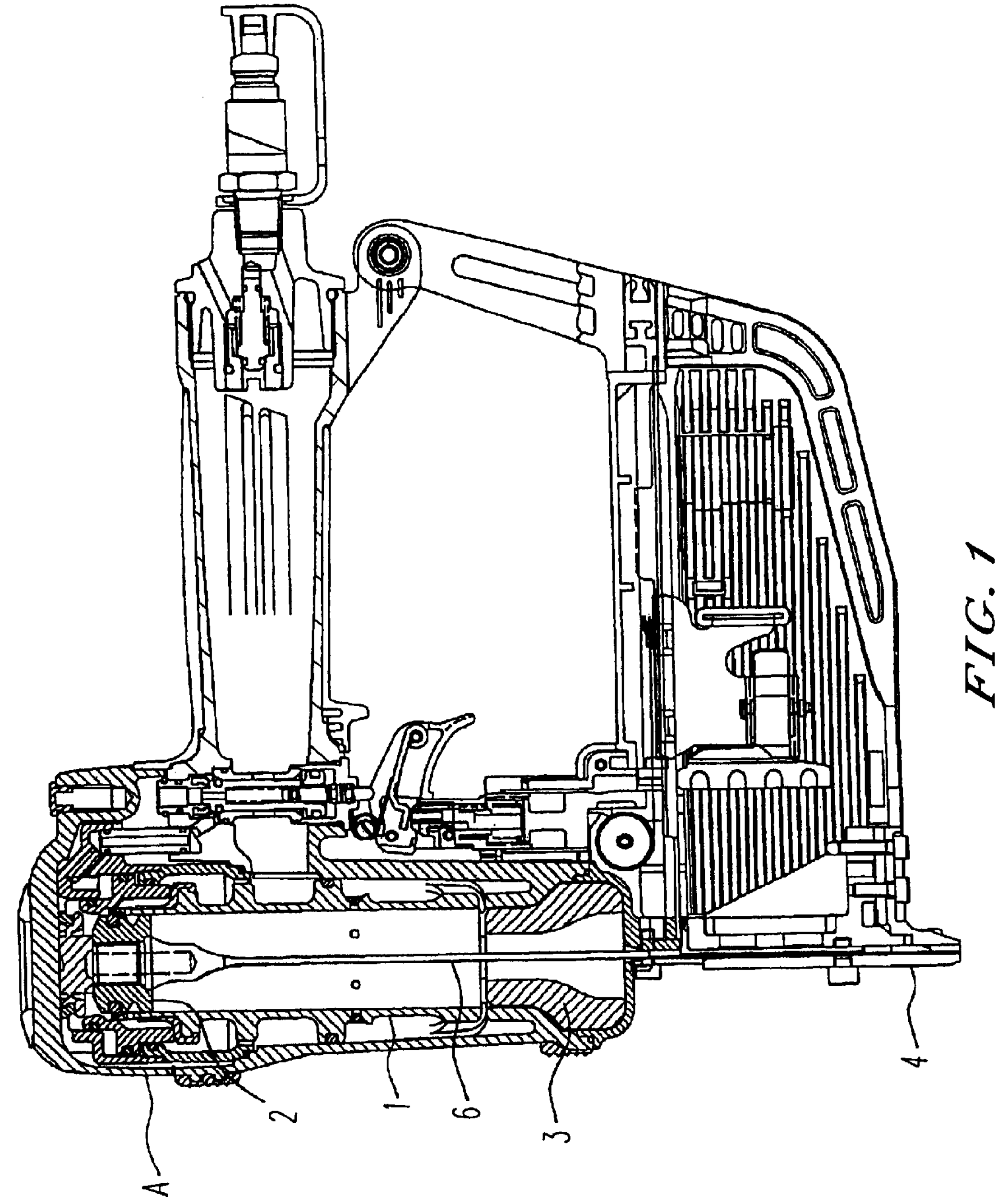
FIG. 1 is a side view illustrating of an embodiment of a nailer according to the present invention, a part of which is shown in section.

In FIG. 1, a reference numeral 1 designates an impact cylinder, a numeral 2 an impact piston, and a numeral 3 a bumper. A nose portion 4 is disposed downward of the impact cylinder 1. The nose portion 4 is constituted in such a manner that a staple (not shown) can be fed therein by a feeding mechanism. The impact piston 2 is slidably stored within the impact cylinder 1, driven by compressed air that is supplied to an upper portion of the impact cylinder 1, and further strikes the staple inside the nose portion 4. Then, a bottom surface of the impact piston 2, which is driven by the compressed air, is received and stopped by the bumper 3. The bumper 3 then absorbs an impact when caused by the collision of the piston 2 with the bumper 3.

As shown in FIG. 2(*a*), a driver 6 is integrally joined together with the impact piston 2 on the lowermost surface thereof. As shown in FIG. 2(*b*), a transverse section of an upper portion 6*a* of the driver 6 is formed in a circular shape, and a transverse section of a lower portion 6*b* of the driver 6 is formed in a rectangular.

Figure 3B:
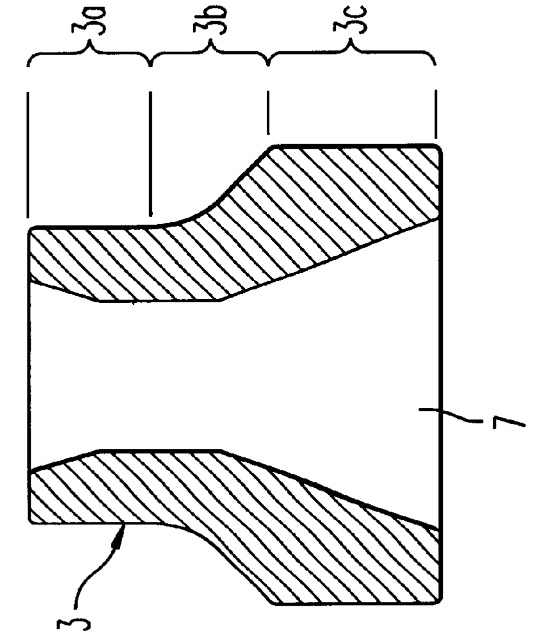
FIG. 3(*a*) is a top view of the bumper in FIG. 1.
Figure 3A:
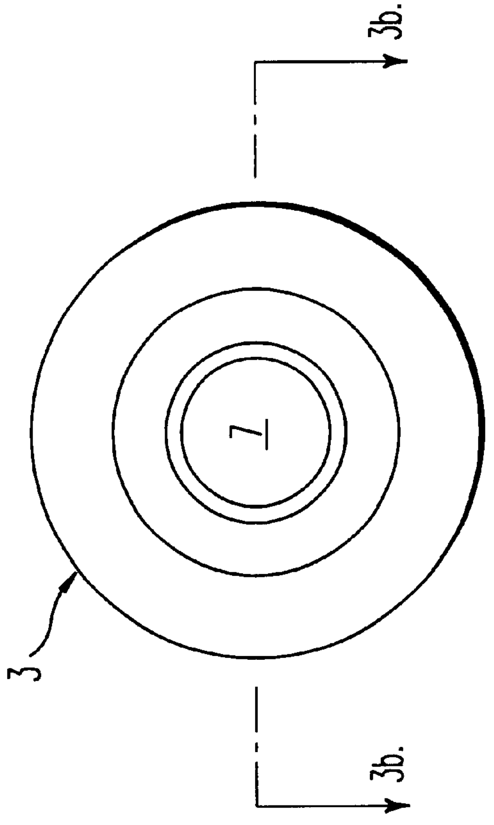

The bumper 3 is constituted of an elastic member such as a rubber. A plane view of the bumper 3 and a transverse section of a center hole 7 for inserting the driver 6, as shown in FIG. 3(*a*), are shaped in circular respectively. The bumper 3 is mounted at a lower portion of a body A. The bumper 3 has an upper small diameter portion 3*a*, an intermediate portion 3*b* and a lower large diameter portion 3*c*, which are continuously formed in a longitudinal configuration.

Figure 4B:
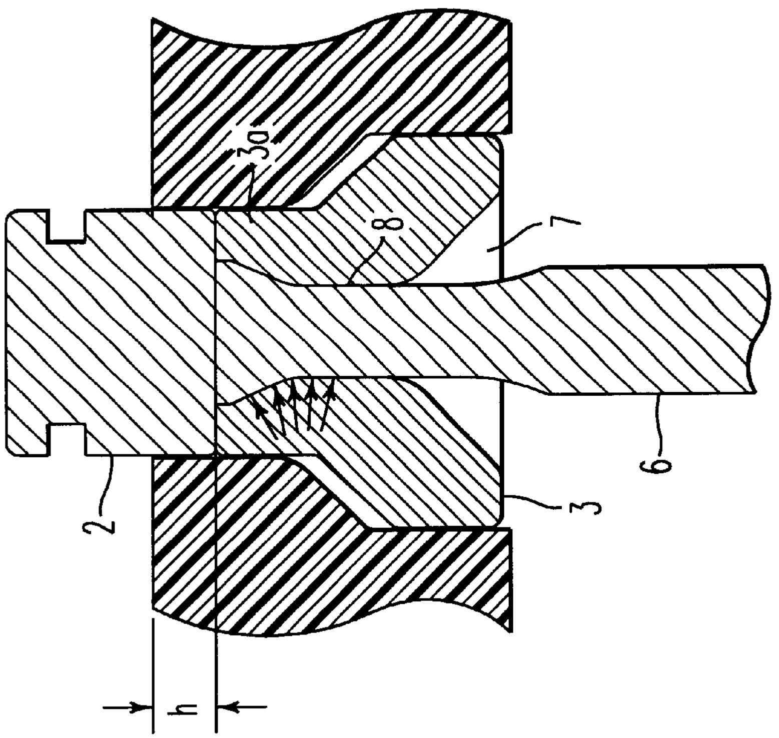
FIG. 4(*a*) and FIG. 4(*b*) are sectional views illustrating a respective state of before and after an impact is made to the bumper in FIG. 1.
Figure 4A:
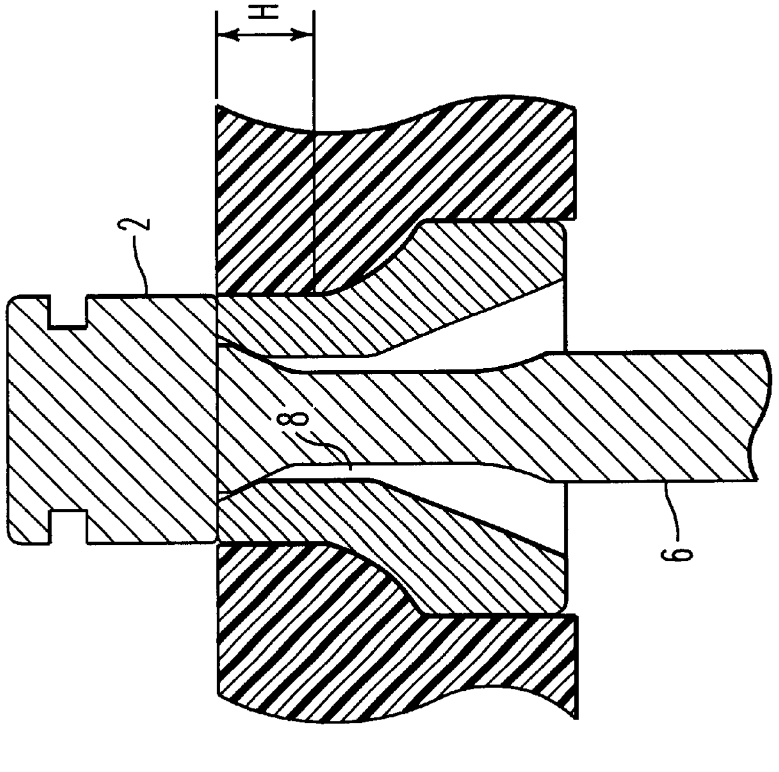
Figure 5B:
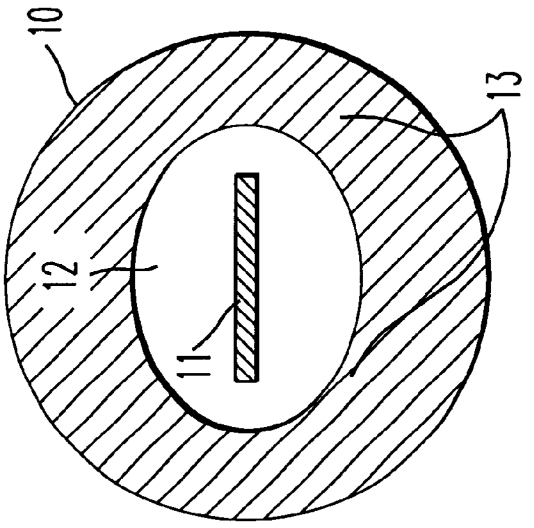
FIG. 5(b) PRIOR ART
FIG. 5(*a*) is a vertical sectional view of a conventional bumper, an impact piston and a driver, and FIG. 5(*b*) is a transverse sectional view of the bumper and the driver of FIG. 5(*a*).
Figure 5A:
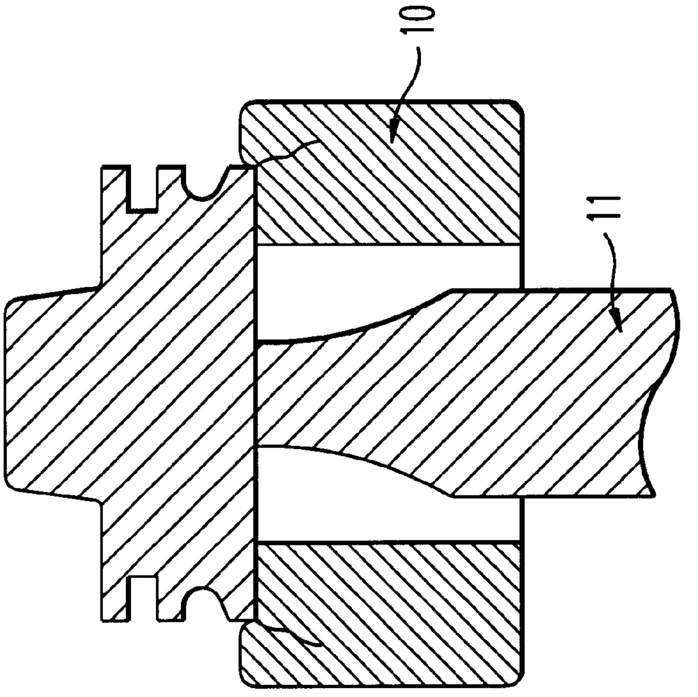
FIG. 5(a) PRIOR ART

The upper small diameter portion 3*a* is formed perpendicular to a bottom surface of the bumper 3, and an outer diameter of which is approximately similar in size to that of the impact piston 2. Further, in the case where the driver 6 is inserted into the upper small diameter portion 3*a* of the central hole 7, as shown in FIG. 4(*a*), a void 8 is slightly formed between the inner surface of the central hole 7 and an outer surface of the driver 6. A height H of the upper small diameter portion 3*a* is formed in such a manner so that the height H is greater than that of a quantity of deflection h due to the impact applied by the impact piston 2.

The lower large diameter portion 3*c* is perpendicular to the bottom surface of the bumper 3, and an outer diameter of which is formed larger than that of the upper small diameter portion 3*a*. Further, the central hole 7 is formed so that a downward side is large and an upward side is small at the lower large diameter portion 3*c*.

The intermediate portion 3*b* is formed so that an outer diameter of a downward side of which is large and an outer diameter of an upward side of which is small in order to connect the upper small diameter portion 3*a* and the lower large diameter portion 3*c*.

Next, the operation of the bumper of the nailer is described here below.

According to the above-described constitution, when the impact piston 2 is driven to make an impact, the driver 6 moves downward through the central hole 7 of the bumper 3, and strikes the staple within the nose portion 4. Then, as shown in FIG. 4(*b*), a bottom surface of the impact piston 2 collides against a top surface of the bumper 3 of at the bottom dead center thereof, and makes the impact on the surface. According to the narrow void 8 formed between the inner surface of the central hole 7 and the outer surface of the driver 6, the upper small diameter portion 3*a* of the bumper 3 is deformed inward by the impact. Then, the inner surface of the central hole 7 is pushed against the outer surface of the upper cylindrical portion of the driver 6, and strong force of braking is worked in the direction shown as arrows in FIG. 4(*b*).

As shown above, the transverse section of the bumper 3 has an annulus ring configuration and the transverse section of the central hole 7 is a circle so that stress is not concentrated at one point when the impact is made on the bumper 3. Therefore, those shapes protect the bumper 3 from being partially deformed. The bumper 3 has no unnecessary portion, and thus enables downsizing thereof without losing the sufficient performance and the durability. Further, a load is equally distributed on the bumper 3, causing an even deformation of the bumper 3. And also such a configuration allows an easier designing of the bumper Further, due to the narrow void 8 formed between the inner surface of the central hole 7 of upper small diameter portion 3*a* of the bumper 3 and the outer surface of the driver 6, the upper small diameter portion 3*a* of the bumper 3 is deformed by the impact made by the impact piston 2. However, the deformation works inward towards the void 8, generating a strong braking force in such a manner as to stop the driver 6. Accordingly, the braking force by a friction is produced between the inner wall of the upper small diameter portion 3*a* and the intermediate portion 3*b* of the bumper 3 and the outer surface of the driver 6. The height of the bumper 3 may be suppressed, as the deformation that occurs in upward and downward direction thereof is not the only means to absorb the energy due to the impact. Further, performance of absorption may be designed by adjusting the void 8 between the bumper 3 and the driver 6.

Furthermore, the height of the upper small diameter portion 3*a* is formed to be greater than the amount of deformation when the impact is made so that a compressed portion cannot escape outward. Therefore, the amount of deformation is small, causing the bumper 3 difficult to be damaged, furthermore, the durability of the bumper 3 is improved.

Consequently, the bumper 3 is provided with the sufficient performance of absorption together with the durability for protecting a damage caused by an excess of the deformation. Therefore, a tool with a large output energy can be obtained even the diameter of the impact piston 2 is small according to the use of the high pressurized compressed air.

Further, the staple is used as a fastener in this embodiment, however, a nail in a needle like configuration may be also used.

Although the invention has been described in its preferred form with a certain degree of particulars, obviously many changes and variations are possible therein. It is therefore to be understood that the present invention may be practiced otherwise than as specifically described herein without departing from the scope and spirit thereof.

What is claimed is:

1. A nailer comprising:

a nailer body having a cylinder mounted therein;

a piston slidably disposed within said cylinder;

a driver mounted to said piston; and a bumper mounted within said nailer body and disposed at a lower part of said cylinder, said bumper having a center hole adapted to sidably receive said driver, said bumper has an upper portion and a lower portion, said upper portion having means for pressing against an outer surface of said driver when said piston impacts said upper portion.

2. A nailer comprising:

a nailer body having a cylinder mounted therein;

a piston slidably disposed within said cylinder;

a driver mounted to said piston; and a bumper mounted within said nailer body and disposed at a lower part of said cylinder, said bumper having a center hole adapted to slidably receive said driver, said bumper has an upper portion and a lower portion, said upper portion having a diameter that is smaller than a diameter of said lower portion, said upper portion having an annular cross section, said upper portion having a top surface configured to receive said piston, said top surface having an outer diameter of a substantially equal size to an outer diameter of said piston, said upper portion having an outer surface that abuts said nailer body, said upper portion having an inner surface of said center hole configured such that a void is defined between said inner surface of said center hole and an outer surface of said driver, such that said upper portion is deformed inward to press against the outer surface of said driver when said piston impacts said top surface of said upper portion.

3. A nailer comprising:

a nailer body;

a driver having an upper portion with a circular cross section;

an impact piston disposed at the upper portion of said driver for driving a fastener;

an impact cylinder for slidably housing said impact piston therein; and a bumper disposed at a lower part of said impact cylinder, said bumper being mounted at a lower portion of said nailer body, said bumper having a center hole with said driver inserted therein, wherein:

said bumper has an upper small diameter portion and a lower large diameter portion, said upper small diameter portion has a circular cross section, said upper small diameter portion has a top surface for receiving said impact piston, said top surface having an outer diameter of a substantially equal size to an outer diameter of said impact piston, said upper small diameter portion has an outer surface that is closely contacted to said nailer body, and a void is formed between an inner surface of said center hole and an outer surface of said driver, and said upper small diameter portion is deformed inward to press the outer surface of said driver caused by an impact of a collision of said impact piston.

4. A nailer according to claim 3, wherein a height of said upper small diameter portion is larger than an amount of longitudinal shrinkage of said upper small diameter portion caused by the impact of the collision of said impact piston.

* * * * *